July 14, 1936.　　　J. C. BROOKS　　　2,047,253

SAFETY BARRIER

Filed July 6, 1934

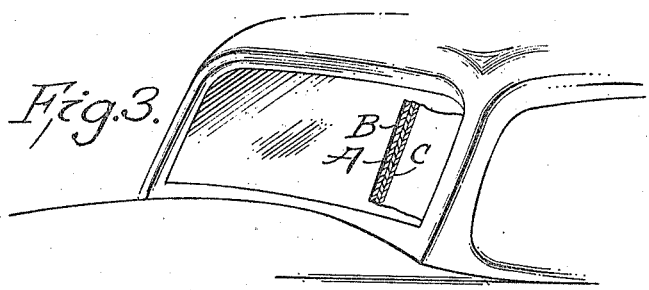

Fig. 3.

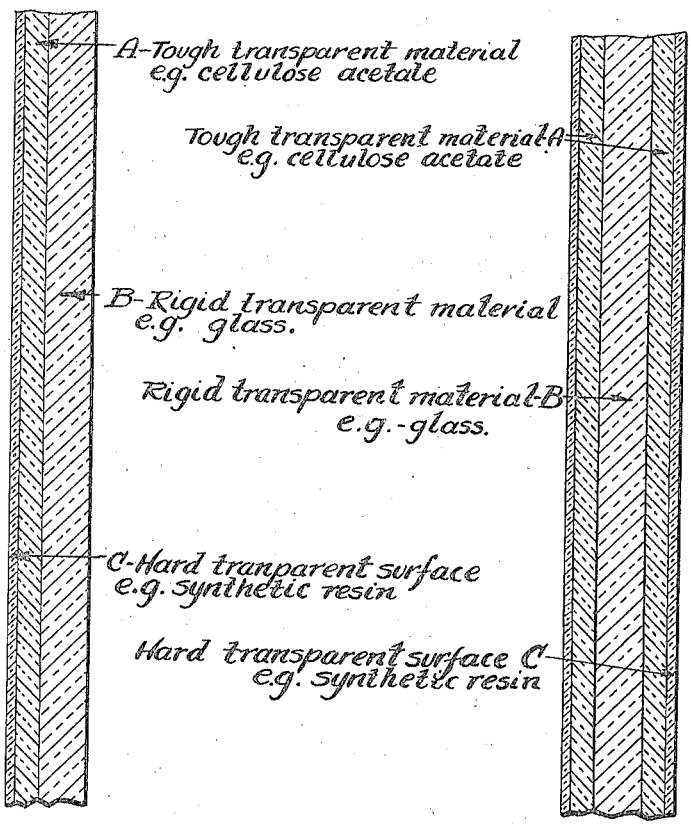

A—Tough transparent material e.g. cellulose acetate

Tough transparent material A e.g. cellulose acetate

B—Rigid transparent material e.g. glass.

Rigid transparent material B e.g. glass.

C—Hard transparent surface e.g. synthetic resin

Hard transparent surface C e.g. synthetic resin

Fig. 1　　　Fig. 2

Inventor:
John C. Brooks,
By Macleod Calm Copeland & Dike
Attorneys.

Patented July 14, 1936

2,047,253

UNITED STATES PATENT OFFICE 2,047,253

SAFETY BARRIER

John C. Brooks, Longmeadow, Mass., assignor to The Fiberloid Corporation, Indian Orchard, Mass., a corporation of Massachusetts Application July 6, 1934, Serial No. 733,981

7 Claims. (Cl. 296—84)

The present invention relates to material referred to as laminated safety glass which is commonly employed for windshields and windows of automobiles and for other industrial uses. The object of the present invention is a stronger and more effective barrier which will afford greater safety and which can be produced at a very greatly reduced cost.

Heretofore, it has been considered that it is necessary to employ at least two layers of glass, one of which must therefore be placed on the side of the barrier toward the persons to be protected. The two or more layers of glass being secured together by a suitable material which is itself tough and being firmly bonded to the exterior layers of glass, it is intended to prevent the flying of fragments or flinders of glass in case of sudden injury to the barrier. However, it is well recognized that, although the glass may firmly adhere to the intermediate layer, nevertheless fragments of glass may be broken out of the glass itself and do serious injury.

The present invention makes possible the use of a single sheet of glass and yet affords better protection since there is no exposed surface of glass on the side toward the person to be protected.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

Fig. 1 is a cross section of a safety barrier embodying my invention.

Fig. 2 is a similar view of a safety barrier embodying my invention in modified form.

Fig. 3 is a perspective partially broken away showing the material applied to a vehicle.

Referring to the drawing, at B in Fig. 1 is shown a sheet of glass which furnishes the rigidity necessary for the support of the whole structure. Secured to one face of the sheet of glass is a layer A of tough, transparent material which is firmly bonded to the surface of the glass. At present, there are many materials suitable for this layer, for instance, the cellulose compound plastics, particularly the esters or ethers, and especially cellulose nitrate and acetate, also certain tough synthetic resins as, for example, phenolic or vinyl resins.

In actual practice, I prefer to use cellulose acetate.

The exposed surface of the tough, transparent layer is rendered hard in some convenient way, for instance, by case-hardening the surface of the layer itself or, preferably, by the addition of a thin, independent surface layer C of some extremely hard material, such as a coating of hard phenolic resin which may be applied either in the form of a sheet or as a liquid.

In Fig. 2, I have shown a barrier composed of a central sheet of glass or other rigid transparent material to both faces of which are applied plastic layers of a kind already described in connection with Fig. 1 and having their exposed surfaces coated with a hard surface coating, as already described.

The barrier made in accordance with my invention is more resistant to breakage than ordinary laminated glass. I have found that a piece of laminated glass composed of two sheets of glass secured together by a single sheet of plastic material is less resistant to breakage by impact than is a similar piece composed of a single layer of glass and a single layer of plastic each the same as where two pieces of glass are used. Falling ball tests show that the material made with the single layer of glass is at least 50% stronger than that having two layers of glass. Probably this is due to the fact that there is no shearing effect when only one piece of glass is used while in the standard laminated glass the plastic tends to be sheared between the fractured layers of glass.

In employing my improved transparent barrier where glass is used, I place the glass face away from the person or thing to be protected. In Fig. 3 I have shown the barrier used, for example, as a windshield of a motor vehicle and as will be observed, the glass layer B is disposed at the outside and the relatively hard surface of non-vitreous material is exposed on the inside. In this way, there is no glass on the side toward the person to be protected and, in case of breakage, no shreds or splinters can be detached to fly and cause injury. Accordingly, my improved safety glass affords much greater protection than that afforded by the present laminated safety glass having two glass faces.

Furthermore, the glass layer which is on the outside is an efficient protection against scratching while the hardened layer on the inside accomplishes a like result. It will be understood, of course, that in automobiles and similar places the interior surface is subjected to much less scratching than is the outside surface and, therefore, a glass-like hardness on the inside surface is less important than on the outside.

The particular transparent material above described is not claimed herein, being covered by the claims of a divisional application filed December 30, 1935, Serial No. 56,659.

I claim:

1. In a vehicle and mounted therein, a transparent barrier comprising a sheet of glass having firmly bonded to its surface facing the interior of the vehicle a sheet of tough, transparent material having a substantially non-scratching and non-splintering exposed surface.

2. In a vehicle and mounted therein, a transparent barrier comprising a sheet of glass having firmly bonded to its surface facing the interior of the vehicle a sheet of tough, transparent material having an exposed inner surface which is substantially non-splintering and non-scratching and harder than the interior of said material.

3. In a vehicle, a transparent barrier comprising a sheet of glass having firmly bonded to its surface facing the interior of the vehicle a sheet of tough, transparent material, said material having its inner surface coated with a layer of transparent non-vitreous material which is relatively harder than the first-mentioned material.

4. In a vehicle, a transparent barrier comprising a sheet of glass having firmly bonded to its surface facing the interior of the vehicle a sheet of tough, transparent material, said material having its inner surface coated with a layer of transparent material harder than said last-mentioned material and including a synthetic resin.

5. In a vehicle, a transparent safety barrier comprising a sheet of glass having firmly bonded to its surface facing the interior of the vehicle a sheet of tough, transparent cellulose plastic material which has its inner surface coated with a non-vitreous transparent layer substantially harder than the plastic material.

6. In a vehicle, a transparent safety barrier comprising a sheet of glass having firmly bonded to its surface facing the interior of the vehicle a sheet of tough, transparent cellulose plastic material which has its inner surface coated with a hard transparent layer of material including a synthetic resin.

7. In a vehicle, a transparent barrier comprising a sheet of glass having firmly bonded to each surface a sheet of tough, transparent material, said material having its surfaces coated with a layer of transparent material harder than said last-mentioned material and including a synthetic resin.

JOHN C. BROOKS.